(12) United States Patent
Trautner et al.

(10) Patent No.: US 11,413,694 B2
(45) Date of Patent: Aug. 16, 2022

(54) SAW BLADE

(71) Applicant: MILWAUKEE ELECTRIC TOOL CORPORATION, Brookfield, WI (US)

(72) Inventors: Paul Trautner, Menomonee Falls, WI (US); Shane N. Felton, Colgate, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/307,231

(22) Filed: May 4, 2021

(65) Prior Publication Data

US 2021/0252618 A1 Aug. 19, 2021

Related U.S. Application Data

(60) Division of application No. 17/026,776, filed on Sep. 21, 2020, now Pat. No. 11,040,407, which is a continuation of application No. 15/340,483, filed on Nov. 1, 2016, now Pat. No. 10,814,414.

(60) Provisional application No. 62/374,256, filed on Aug. 12, 2016, provisional application No. 62/249,936, filed on Nov. 2, 2015.

(51) Int. Cl.
*B23D 61/12* (2006.01)
*B23D 65/00* (2006.01)
*B23D 61/14* (2006.01)

(52) U.S. Cl.
CPC ......... *B23D 61/125* (2013.01); *B23D 61/121* (2013.01); *B23D 61/14* (2013.01); *B23D 65/00* (2013.01)

(58) Field of Classification Search
CPC .... B23D 61/125; B23D 61/121; B23D 61/14; B23D 65/00

USPC ........................................................ 83/835
See application file for complete search history.

(56) References Cited

U.S. PATENT DOCUMENTS

| 1,336,209 A | 4/1920 | Driver |
| 1,523,518 A | 10/1923 | Dragon |
| D162,794 S | 4/1951 | Derr |
| (Continued) | | |

FOREIGN PATENT DOCUMENTS

| CN | 2843792 Y | 12/2006 |
| CN | 1923418 A | 3/2007 |
| (Continued) | | |

OTHER PUBLICATIONS

Japanese Patent Office Action for Application No. 2018522600 dated Mar. 5, 2019, 16 pages, with English translation.

(Continued)

*Primary Examiner* — Omar Flores Sanchez
(74) *Attorney, Agent, or Firm* — Michael Best & Friedrich LLP

(57) ABSTRACT

A saw blade includes a body and a plurality of cutting teeth formed on the body. Each cutting tooth includes a tip at a first end of the cutting tooth, a rake face extending from the tip toward the body, a relief face extending from the tip toward a second end of the cutting tooth and sloping toward the body, and a projection at the second end of the cutting tooth and sloping away from the body. The saw blade also includes a plurality of gullets formed on the body between the plurality of cutting teeth. Each gullet forms an undercut portion between the body and the projection of each cutting tooth.

20 Claims, 10 Drawing Sheets

(56) References Cited

U.S. PATENT DOCUMENTS

| | | |
|---|---|---|
| 2,741,279 A | 4/1956 | Stratton |
| 3,374,815 A | 3/1968 | Anderson, Jr. et al. |
| 4,036,236 A | 7/1977 | Rhodes, Jr. |
| 4,339,977 A | 7/1982 | Miller |
| 4,739,557 A | 4/1988 | Wagner |
| D352,218 S | 11/1994 | Nygards |
| 5,417,777 A | 5/1995 | Henderer |
| 5,451,128 A | 9/1995 | Hattersley |
| 5,758,561 A | 6/1998 | Curtsinger et al. |
| D406,023 S | 2/1999 | Okada |
| 5,946,985 A | 9/1999 | Carlsen et al. |
| 6,065,380 A | 5/2000 | Lundh |
| 6,119,571 A | 9/2000 | Hayden, Sr. |
| 6,244,152 B1 | 6/2001 | Di Nicolantonio |
| D473,121 S | 4/2003 | Eads |
| D482,945 S | 12/2003 | Grolimund |
| D527,233 S | 8/2006 | Burke, III |
| 7,127,979 B2 | 10/2006 | Kocher et al. |
| 7,225,714 B2 | 6/2007 | Rompel et al. |
| D555,444 S | 11/2007 | Ammann |
| D565,369 S | 4/2008 | Dawson |
| D686,470 S | 7/2013 | Ji |
| D688,543 S | 8/2013 | Neitzell et al. |
| 8,689,667 B2 | 4/2014 | Butzen et al. |
| D706,099 S | 6/2014 | Neitzell et al. |
| 8,776,659 B2 | 7/2014 | Butzen et al. |
| D725,450 S | 3/2015 | Hampton et al. |
| D732,914 S | 6/2015 | Hampton et al. |
| 9,079,259 B2 | 7/2015 | Grolimund |
| 9,132,492 B2 | 9/2015 | Butzen et al. |
| 9,757,807 B2 | 9/2017 | Hampton et al. |
| 9,827,626 B2 | 11/2017 | Kazda et al. |
| 9,884,380 B2 | 2/2018 | Muti et al. |
| 10,112,244 B2 | 10/2018 | Butzen et al. |
| D835,955 S | 12/2018 | Bloom et al. |
| D835,956 S | 12/2018 | Felton et al. |
| 10,189,099 B2 | 1/2019 | Butzen et al. |
| 10,252,358 B2 | 4/2019 | Butzen et al. |
| 10,363,619 B2 | 7/2019 | George et al. |
| D862,184 S | 10/2019 | Bloom et al. |
| 10,814,414 B2 | 10/2020 | Trautner et al. |
| 2002/0042998 A1 | 4/2002 | Napoli |
| 2002/0184988 A1 | 12/2002 | Rohman et al. |
| 2003/0024354 A1 | 2/2003 | Ward et al. |
| 2003/0200853 A1 | 10/2003 | Gongola |
| 2004/0060396 A1 | 4/2004 | Tichler et al. |
| 2005/0211023 A1 | 9/2005 | Kalo |
| 2005/0211046 A1 | 9/2005 | Thomas et al. |
| 2005/0262702 A1 | 12/2005 | Hawthorn |
| 2006/0016315 A1 | 1/2006 | Zorich et al. |
| 2006/0065098 A1 | 3/2006 | Cranna |
| 2006/0174495 A1 | 8/2006 | Jumior |
| 2006/0207398 A1 | 9/2006 | Nicolson et al. |
| 2007/0151436 A1* | 7/2007 | Donnerdal ........... B23D 61/021 83/835 |
| 2008/0072411 A1 | 5/2008 | Ahorner et al. |
| 2009/0119931 A1 | 5/2009 | Gongola |
| 2009/0126712 A1 | 5/2009 | Kullmann et al. |
| 2009/0145280 A1 | 6/2009 | Bucks et al. |
| 2009/0199693 A1 | 8/2009 | Heyen |
| 2010/0011933 A1* | 1/2010 | Lucas ................... B23D 61/04 83/835 |
| 2010/0218655 A1 | 9/2010 | Gillette et al. |
| 2011/0017042 A1 | 1/2011 | Kullmann et al. |
| 2011/0259168 A1 | 10/2011 | Butzen et al. |
| 2012/0090443 A1 | 4/2012 | Butzen et al. |
| 2013/0228059 A1 | 9/2013 | Kazda et al. |
| 2013/0333541 A1 | 12/2013 | Karlen et al. |
| 2014/0283667 A1 | 9/2014 | Butzen et al. |
| 2017/0120356 A1 | 5/2017 | George et al. |
| 2017/0120357 A1 | 5/2017 | Trautner et al. |
| 2017/0326661 A1 | 11/2017 | Butzen et al. |
| 2018/0085838 A1 | 3/2018 | Green |
| 2018/0099342 A1 | 4/2018 | Muti et al. |
| 2019/0039158 A1 | 2/2019 | Butzen et al. |
| 2019/0168320 A1 | 6/2019 | Butzen et al. |

FOREIGN PATENT DOCUMENTS

| | | |
|---|---|---|
| CN | 101970163 A | 2/2011 |
| CN | 102019314 A | 4/2011 |
| CN | 104918739 A | 9/2015 |
| CN | 106180895 A | 12/2016 |
| DE | 10303915 A1 | 8/2004 |
| DE | 102011054648 A1 | 4/2013 |
| EP | 0072642 A2 | 2/1983 |
| JP | S293087 Y | 3/1954 |
| JP | S486074 Y | 2/1973 |
| JP | S5271181 U | 11/1975 |
| JP | 2003048121 A | 2/2003 |
| TW | M511388 U | 11/2015 |
| WO | 9006839 A1 | 6/1990 |
| WO | 9605932 A1 | 2/1996 |
| WO | 0170471 A1 | 9/2001 |
| WO | 2011140533 A1 | 11/2011 |

OTHER PUBLICATIONS

International Search Report and Written Opinion for Application No. PCT/US2016/059889 dated Jan. 1, 2017 (15 pages).

Japanese Patent Office Action for Application No. 2018522600 dated Jul. 9, 2019 (9 pages, English translation included).

* cited by examiner

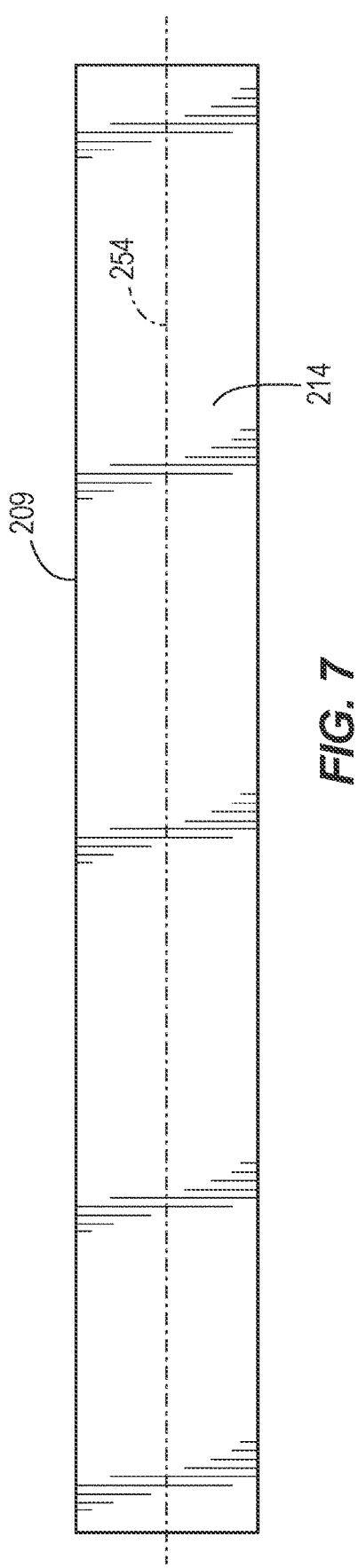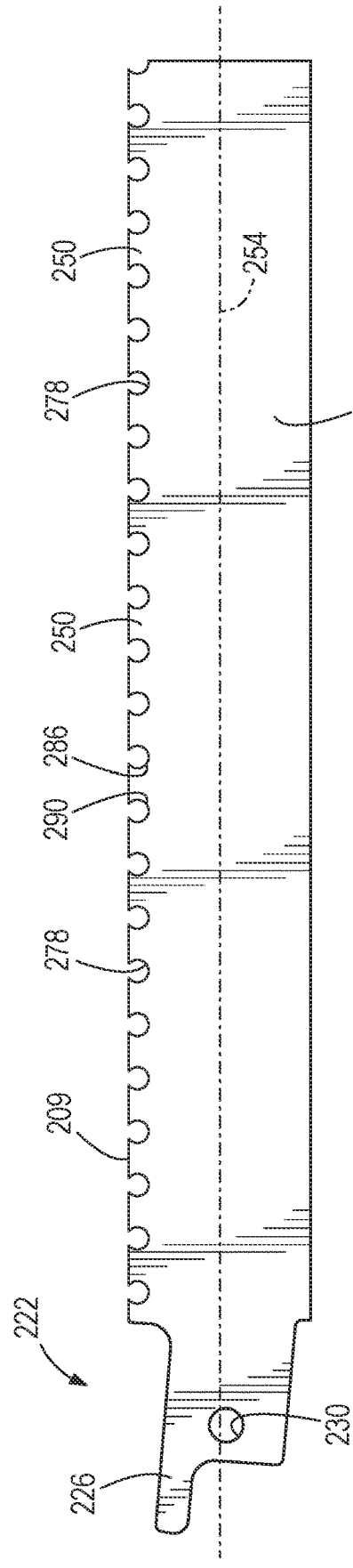

SAW BLADE

CROSS-REFERENCE TO RELATED APPLICATIONS

This application is a divisional of U.S. patent application Ser. No. 17/026,776, filed Sep. 21, 2020, now U.S. Pat. No. 11,040,407, which is a continuation of U.S. patent application Ser. No. 15/340,483, filed Nov. 1, 2016, now U.S. Pat. No. 10,814,414, which claims priority to U.S. Provisional Patent Application No. 62/249,936, filed Nov. 2, 2015, and U.S. Provisional Patent Application No. 62/374,256, filed Aug. 12, 2016, the entire contents of which are incorporated herein by reference.

BACKGROUND

The present invention relates to saw blades and, more particularly, to reciprocating saw blades with carbide inserts.

SUMMARY

In one embodiment, a saw blade includes a body and a plurality of cutting teeth formed on the body. Each cutting tooth includes a tip at a first end of the cutting tooth, a rake face extending from the tip toward the body, a relief face extending from the tip toward a second end of the cutting tooth and sloping toward the body, and a projection at the second end of the cutting tooth and sloping away from the body. The saw blade also includes a plurality of gullets formed on the body between the plurality of cutting teeth. Each gullet forms an undercut portion between the body and the projection of each cutting tooth.

In another embodiment, a method of manufacturing a saw blade includes providing a saw blade body and forming a plurality of tooth bodies in the saw blade body. Each tooth body includes a rake face extending from a first end of the tooth body toward the saw blade body, a relief face extending from the first end of the tooth body toward a second end of the tooth body and sloping toward the saw blade body, and a projection at the second end of the tooth body and sloping away from the saw blade body. The method also includes forming a plurality of gullets in the saw blade body between the plurality of tooth bodies. Each gullet forms an undercut portion between the saw blade body and the projection of each tooth body.

In another embodiment, a saw blade includes a body and a plurality of cutting teeth formed on the body. Each cutting tooth includes a first tip at a first end of the cutting tooth, a first rake face extending from the first tip toward the body, a second tip at a second end of the cutting tooth, and a second rake face extending from the second tip toward the body. The first rake face has a first linear segment extending from the first tip and a first curved segment between the first linear segment and the body. The second rake face has a second linear segment extending from the second tip and a second curved segment between the second linear segment and the body. The saw blade also includes a plurality of gullets formed on the body between the plurality of cutting teeth. Each gullet forms a first undercut portion at the first curved segment of one of the plurality of cutting teeth and a second undercut portion at the second curved segment of an adjacent cutting tooth.

In another embodiment, a method of manufacturing a saw blade includes providing a saw blade body having an edge, coupling a carbide strip to the edge of the saw blade body, and forming a plurality of cutting teeth in the carbide strip and the saw blade body after the carbide strip is coupled to the edge. Each cutting tooth includes a first tip at a first end of the cutting tooth, a first rake face extending from the first tip toward the saw blade body, a second tip at a second end of the cutting tooth, and a second rake face extending from the second tip toward the saw blade body. The first rake face has a first linear segment extending from the first tip and a first curved segment between the first linear segment and the saw blade body. The second rake face has a second linear segment extending from the second tip and a second curved segment between the second linear segment and the saw blade body. The method also includes forming a plurality of gullets in the saw blade body between the plurality of cutting teeth. Each gullet forms a first undercut portion at the first curved segment of one of the plurality of cutting teeth and a second undercut portion at the second curved segment of an adjacent cutting tooth.

Other aspects of the invention will become apparent by consideration of the detailed description and accompanying drawings.

BRIEF DESCRIPTION OF THE DRAWINGS

FIG. 7 illustrates a saw blade body.

FIG. 8 illustrates tooth bodies and gullets formed in the saw blade body.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Unless otherwise stated, the term "approximately" as used herein refers to values that are within normal manufacturing tolerances of saw blades.

DETAILED DESCRIPTION

Figure 1:
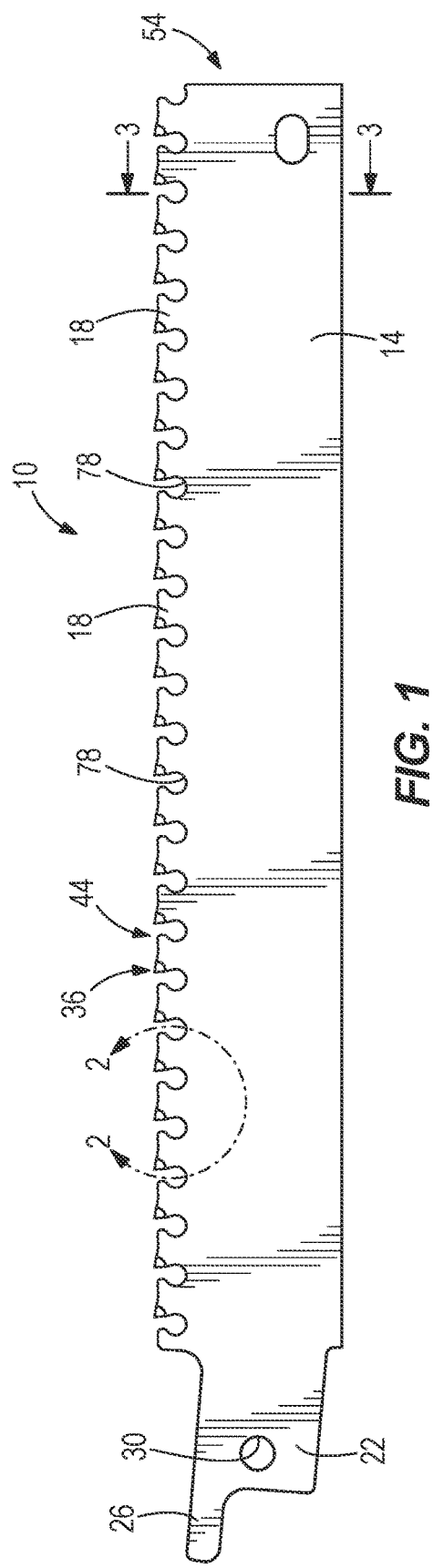
FIG. 1 is a side view of a saw blade embodying the invention.

FIG. 1 illustrates a saw blade 10. The saw blade 10 includes a saw blade body 14 having a plurality of cutting teeth 18 formed thereon. The saw blade 10 also includes an attachment portion 22 extending from the saw blade body 14. The attachment portion 22 has a tang 26 and an aperture 30 for connecting the saw blade 10 to a reciprocating saw (not shown). Before the cutting teeth 18 are formed on the saw blade body 14, the saw blade body 14 is considered to be a saw blade blank. A "blank" refers to a piece of material (e.g., steel coil stock) that is used to form a saw blade before the saw blade is complete (e.g., before the saw blade is fully formed with cutting teeth).

Figure 2:
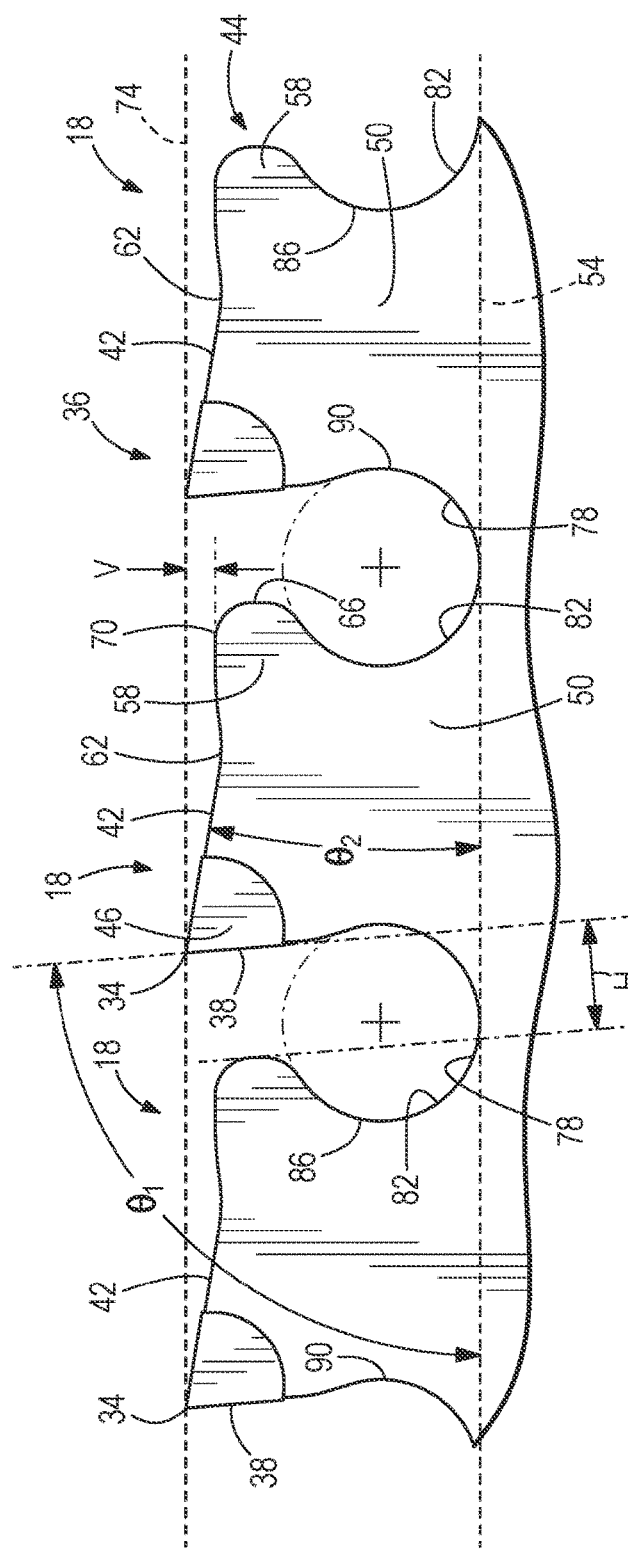
FIG. 2 is an enlarged side view of a portion of the saw blade of FIG. 1.

FIG. 2 illustrates three of the cutting teeth 18 in more detail. All of the cutting teeth 18 on the saw blade 10 are generally the same shape and size. Each cutting tooth 18 includes a tip 34 at a first end 36 of the cutting tooth 18, a rake face 38 adjacent the first end 36, and a relief face 42 extending toward a second end 44 of the cutting tooth 18. Each tip 34 is formed by a cutting insert 46 secured to a tooth body 50 (i.e., the remainder of the cutting tooth 18). In the illustrated embodiment, each cutting insert 46 is a carbide insert, and each tooth body 50 is formed of steel (e.g., the saw blade body 14 is formed of steel). In other embodiments, the cutting inserts 46 may be omitted so that each tip 34 is formed from a portion of each tooth body 50. The illustrated inserts 46 may be secured to the tooth body 50 by conventional techniques, such as resistance welding, brazing, etc.

Figure 3:
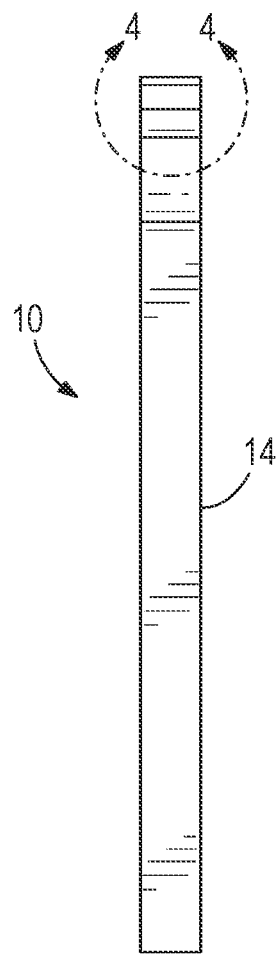
FIG. 3 is a cross sectional view of the saw blade taken along 3-3 of FIG. 1.
Figure 4:
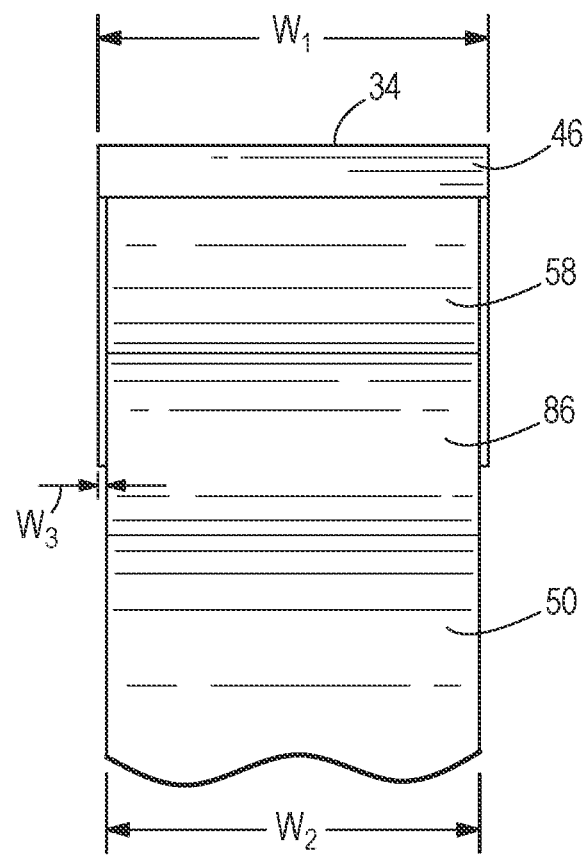
FIG. 4 is an enlarged view of a portion of the saw blade of FIG. 3.

As shown in FIGS. 3 and 4, the cutting inserts 46 include an insert width $W_1$ that is slightly wider than a tooth body width $W_2$ of the tooth bodies 50. For example, each cutting insert 46 has a width $W_3$ that extends between approximately 0.01 millimeters to approximately 0.03 millimeters on both sides of each tooth body 50. In addition to or as an alternative to the cutting inserts 46 being wider than the tooth bodies 50, the cutting teeth 18 may be set in any desired pattern.

With reference back to FIG. 2, the rake faces 38 extend from each tip 34 generally toward a longitudinal axis 54 of the saw blade body 14. The longitudinal axis 54 is a linear axis extending along the length of the saw blade body 14. In other embodiments, the longitudinal axis 54 may be curved to wrap around the body of, for example, a hole saw. Each illustrated rake face 38 is defined partially by one cutting insert 46 and partially by one tooth body 50. In the illustrated embodiment, the rake faces 38 are oriented at a first angle $\theta_1$ (e.g., approximately 85 degrees) relative to the longitudinal axis 54 of the saw blade body 14. In other embodiments, the rake faces 38 may be angled at any other desired positive, negative, or zero rake angle.

With continued reference to FIG. 2, the relief faces 42 also extend from each tip 34, but generally toward the next successive cutting tooth 18. In particular, the illustrated relief faces 42 extend linearly from each tip 34 and are sloped or angled toward the saw blade body 14. Similar to the rake faces 38, the relief faces 42 are defined partially by one cutting insert 46 and partially by one tooth body 50. In the illustrated embodiment, each relief face 42 is oriented at a second angle $\theta_2$ (e.g., approximately 10 degrees) relative to the longitudinal axis 54 of the saw blade body 14. In other embodiments, each relief face 42 may be angled at a greater or lesser angle, or each relief face 42 may be at least partially curved.

As shown in FIG. 2, each cutting tooth 18 also includes a material limiter 58 at the second end 44 of the cutting tooth 18. Each material limiter 58 is a projection formed at a distal end 62 of each relief face 42 opposite from each tip 34. The material limiters 58 extend toward the next successive cutting tooth 18. In the illustrated embodiment, each material limiter 58 is sloped away from the longitudinal axis 54 of the saw blade body 14 relative to each relief face 42 (i.e., upwardly in FIG. 2). In addition, each material limiter 58 has a rounded end 66 facing the next successive cutting tooth 18.

The illustrated material limiters 58 are sloped at a smaller angle than the angle of the relief faces 42 so that an apex 70 of each limiter 58 is closer to the tips 34 of the cutting tooth 18 than the saw blade body 14. More particularly, the tips 34 of the cutting teeth 18 define a plane 74 that is generally parallel to the longitudinal axis 54 of the saw blade body 14, and the apexes 70 of the material limiters 58 are spaced a vertical distance V from the plane 74 measured in a vertical direction perpendicular to the longitudinal axis 54 and to the plane 74. In the illustrated embodiment, the vertical distance V is approximately 0.25 millimeters. In other embodiments, the vertical distance V may be larger or smaller than 0.25 millimeters. In addition, the apexes 70 of each material limiter 58 are positioned between the distal end 62 of the relief faces 42 and the plane 74 in the vertical direction perpendicular to the plane 74. In the illustrated embodiment, the apex 70 of each material limiter 58 is also positioned between each distal end 62 of the relief faces 42 and each rounded end 66 of the material limiters 58 in a horizontal direction parallel to the plane 74. The illustrated apexes 70 of the cutting tooth 18 are also spaced a horizontal distance H from the rake faces 38 of the next successive cutting tooth 18. The horizontal distance H is measured in a direction perpendicular to the rake faces 38 of each cutting tooth 18. In the illustrated embodiment, the horizontal distance H is approximately 12.5 millimeters. In other embodiments, the horizontal distance H may be larger or smaller than 12.5 millimeters.

As also shown in FIG. 2, gullets 78 are formed on the saw blade body 14 between the cutting teeth 18 (e.g., the rake face 38 of one cutting tooth 18 and the material limiter 58 of another cutting tooth 18 partially define a gullet 78 between two successive cutting teeth 18). The illustrated gullets 78 include an undercut portion 82 that is formed between the material limiter 58 and the saw blade body 14 (i.e., beneath the material limiter 58 in the vertical direction). In particular, each illustrated undercut portion 82 is defined by a rear edge 86 having a first curvature of each tooth body 50. The undercut portions 82 are arranged so that the rounded end 66 of each material limiter 58 is positioned between the undercut portion 82 of one cutting tooth 18 and the tip 34 of an adjacent cutting tooth 18 in the horizontal direction parallel to the longitudinal axis 54. The gullets 78 are also defined by a forward edge 90 having a second curvature of each tooth body 50. The first curvature of the rear edge 86 and the second curvature of the forward edge 90 have a constant radius so that the illustrated gullets 78 are generally circular. The undercut portions 82 increase the size of the gullets 78, yet still allow the material limiters 58 to extend relatively close to the cutting inserts 46 of the next successive cutting tooth 18. In the illustrated embodiment, a first distance defined between the rounded end 66 of each material limiter 58 and the tip 34 of an adjacent tooth body 18 is less than a second distance between the rear edge 86 of each cutting tooth 18 and the rake face 38 of an adjacent cutting tooth 18.

Figure 5:
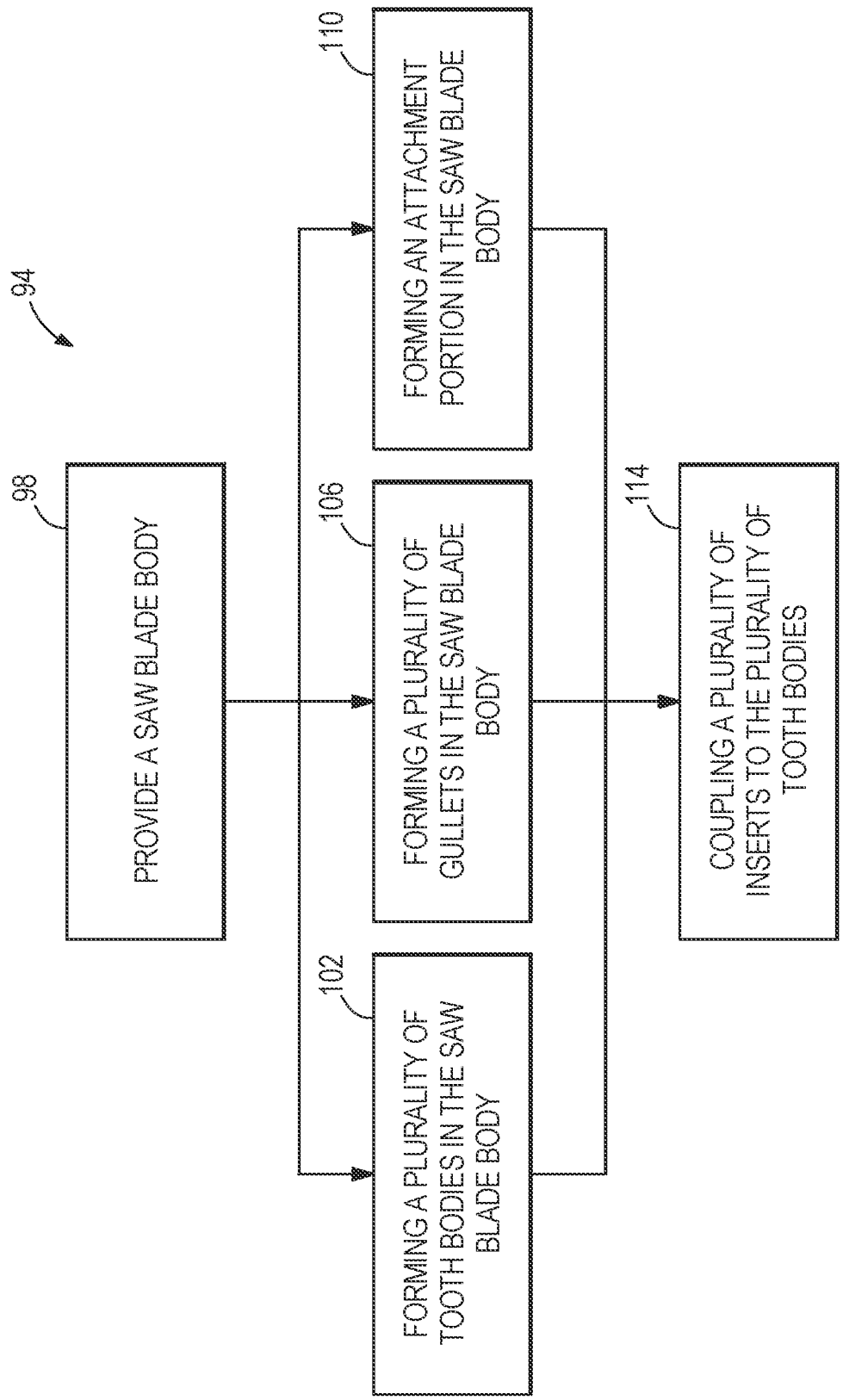
FIG. 5 illustrates a method of manufacturing the saw blade of FIG. 1.

With reference to FIG. 5, a method 94 of manufacturing the saw blade 10 is illustrated. A blank saw blade body 14 (e.g., omitting the tooth bodies 50 and the gullets 78) is provided (step 98) so that the tooth bodies 50, the gullets 78, and the attachment portion 22 are simultaneously formed by a stamping process in the saw blade body 14 (steps 102, 106, 110). The stamping process is advantageous (e.g., quicker)

over other machining processes (e.g., milling, grinding, etc.) to facilitate formation of the gullets 78 with the undercut portions 82. In some embodiments, the attachment portion 22 may be formed in the saw blade body 14 after or before the tooth bodies 50 and the gullets 78 are formed in the saw blade body 14. In other embodiments, the tooth bodies 50, the gullets 78, and/or the attachment portion 22 may be formed by another process (e.g., laser cutting). After the tooth bodies 50 and the gullets 78 are formed in the saw blade body 14, the cutting inserts 46 are secured (e.g., welded, brazed, etc.) to the tooth bodies 50 (step 114).

During cutting operations (e.g., when the saw blade 10 is reciprocated back and forth generally along the longitudinal axis 54 by a reciprocating saw), each material limiter 58 reduces or limits that amount of material that the next successive tooth 18, and particularly the cutting insert 46 of the next successive tooth 18, will encounter. In particular, the material limiters 58 guide the material being cut into adjacent cutting teeth 18 so only a relatively small amount of material contacts the cutting inserts 46. For example, the vertical distance V between the apexes 70 of the material limiters 58 and the tips 34 of the cutting teeth 18 limit the amount of material to 0.25 millimeters, which is equal to the vertical distance V. This is particularly useful when cutting hard materials, such as metal, that may otherwise break or damage the cutting inserts 46. The relatively larger gullets 78 with the undercut portions 82 provide adequate chip removal between cutting teeth 18, even with the material limiters 58 spaced relatively close to the tips 34 of adjacent cutting teeth 18.

In some embodiments, the cutting speed and durability of the cutting inserts 46 may be adjusted by changing the vertical distance V. For example, increasing the vertical distance V between the apexes 70 of the material limiters 58 and the tips 34 of the cutting teeth 18 may increase the cutting speed of the saw blade 10, but lower the durability of the inserts 46. Conversely, decreasing the vertical distance V between the apexes 70 of the material limiters 58 and the tips 34 of the cutting teeth 18 may increase the durability of the cutting inserts 46, but reduce the cutting speed of the saw blade 10.

In the illustrated embodiment, the saw blade 10 includes five teeth per inch (i.e., TPI). In other embodiments, the saw blade 10 may include fewer or more TPI (e.g., four TPI, six TPI, or any fractional number of TPI between four and six). The addition of material limiters 58 and the gullets 78 with the undercut portions 82 to the saw blade 10 allow the saw blade 10 to be manufactured with fewer teeth per inch (e.g., 4-5 TPI vs. 6 TPI in conventional saw blades) so that fewer cutting inserts 46, which are relatively expensive, need to be included on the saw blade 10. In addition, the material limiters 58 help protect the cutting inserts 46 from damage.

FIGS. 6-10 illustrate a saw blade body 214 (FIG. 7) that is formed into a saw blade 210 (FIG. 9) according to an embodiment of the invention. The saw blade 210 is similar to the saw blade 10; therefore, like components have been given like reference numbers plus 200 and only the differences between the saw blades 10, 210 will be discussed in detail. In addition, components or features described with respect to only one or some of the embodiments described herein are equally applicable to any other embodiment described herein.

Figure 6:
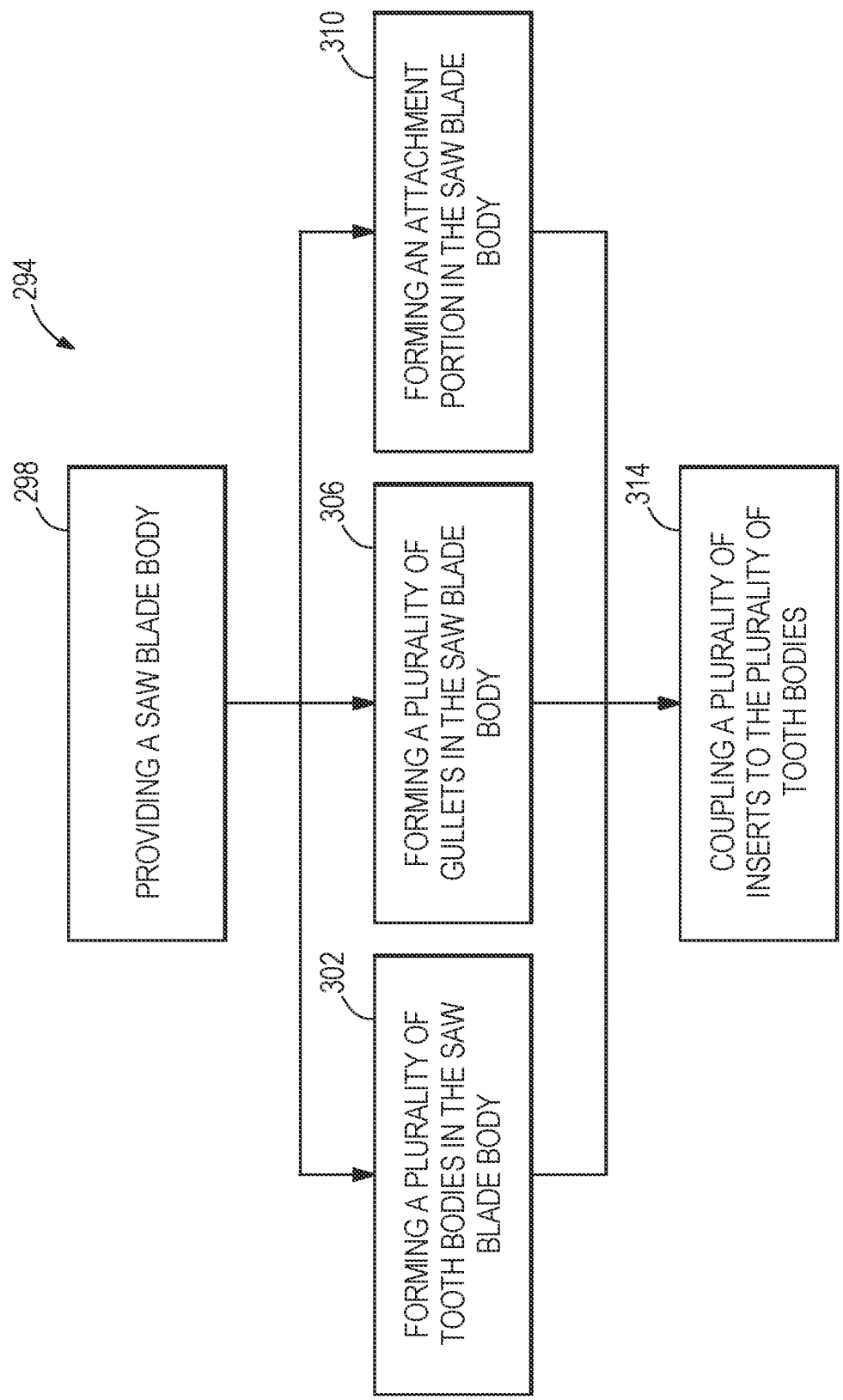
FIG. 6 illustrates a method of manufacturing a saw blade according to another embodiment of the invention.
Figure 9:
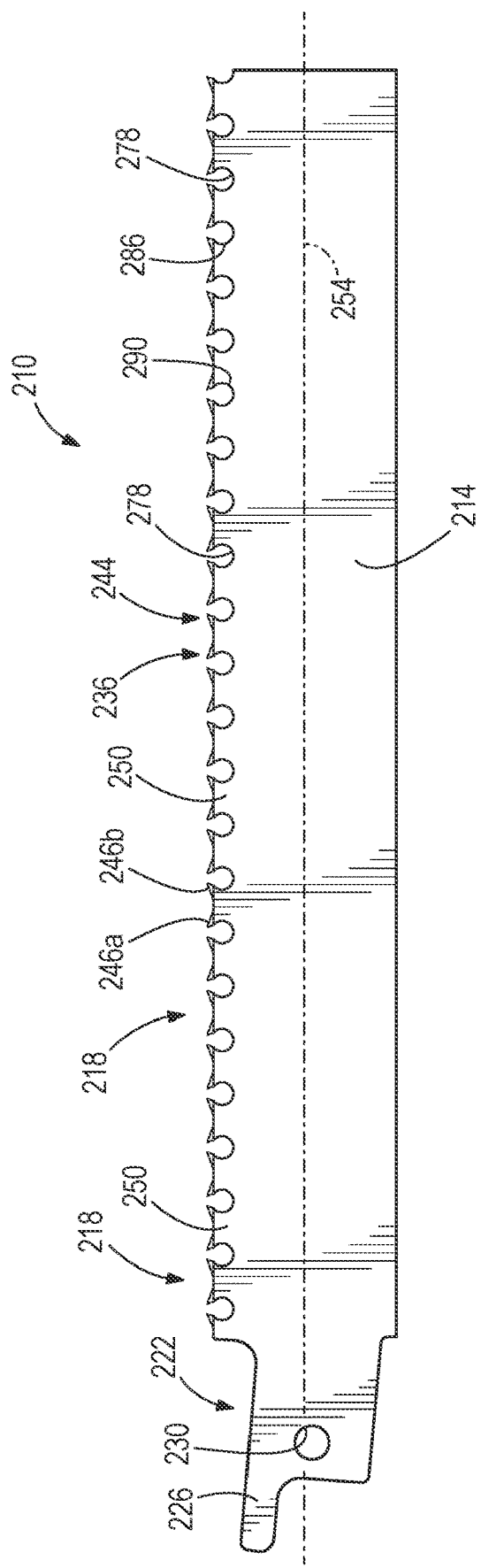
FIG. 9 illustrates cutting inserts coupled to the tooth bodies of FIG. 8 to form cutting teeth.

A method 294 of manufacturing the saw blade 210 is illustrated in FIG. 6. At step 298, a blank saw blade body 214 (FIG. 7) having an edge 209 is provided. In the illustrated embodiment, the edge 209 is parallel to a longitudinal axis 254 of the saw blade body 214.

With reference to FIG. 8, tooth bodies 250, gullets 278, and an attachment portion 222 are simultaneously formed by a stamping process in the saw blade body 214 (steps 302, 306, 310). In other embodiments, the attachment portion 222 may be formed before or after the tooth bodies 250 and the gullets 278 are formed. The illustrated attachment portion 222 includes a tang 226 and an aperture 230 for connecting the saw blade 210 to a reciprocating saw.

Figure 10:
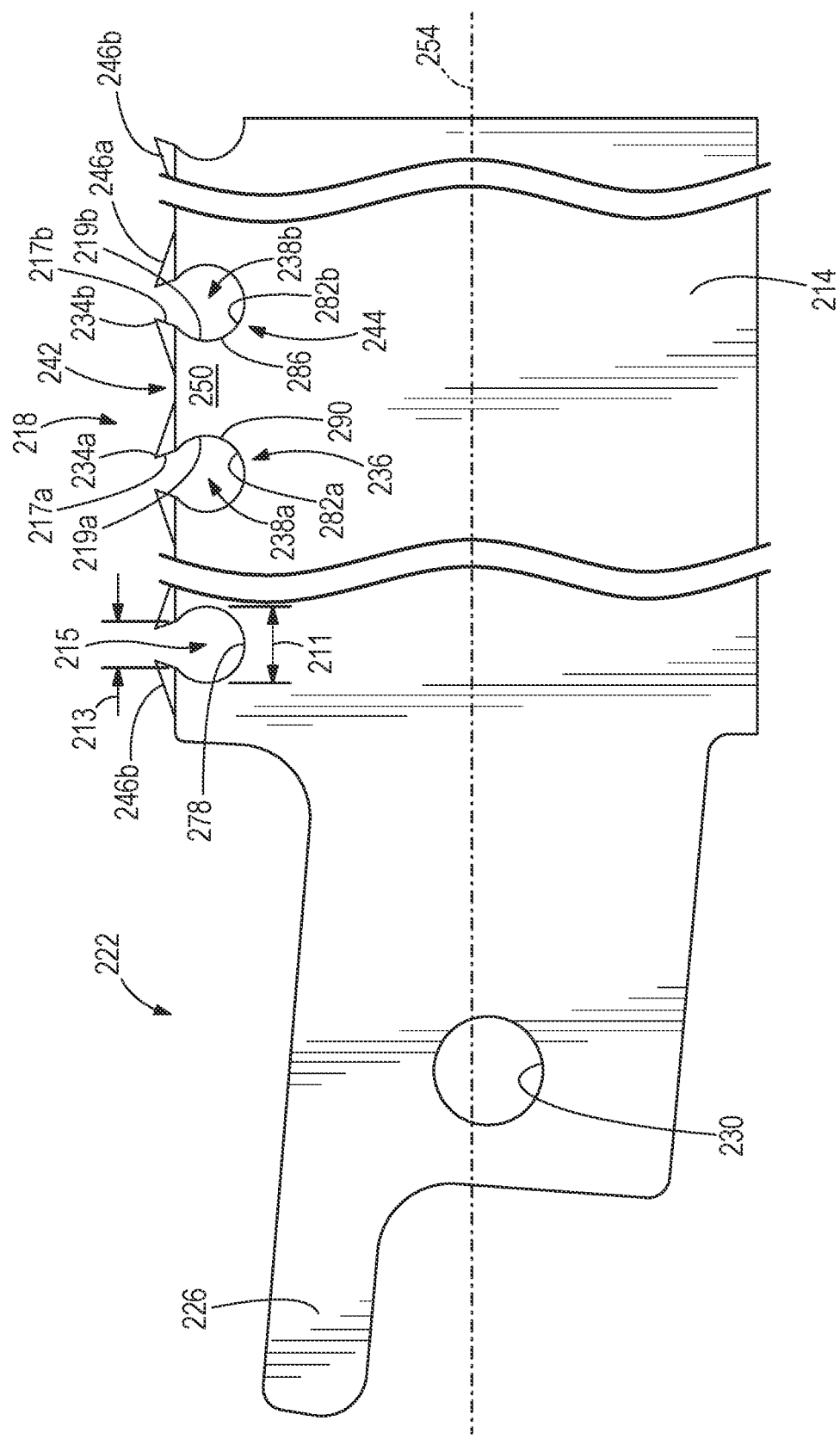
FIG. 10 is an enlarged view of portions of the saw blade of FIG. 9 illustrating the cutting teeth and the gullets.

With reference to FIG. 10, each illustrated gullet 278 includes a first undercut portion 282a defined by a forward edge 290 of the tooth bodies 250 and a second undercut portion 282b defined by a rear edge 286 of the tooth bodies 250. The forward and rear edges 286, 290 have a constant radius so the illustrated gullets 278 are generally circular. Each gullet 278 defines a gullet width 211 that is greater than an opening width 213 of an opening 215 between adjacent tooth bodies 250. The gullet width 211 is measured between the first undercut portion 282a and the second undercut portion 282b of a gullet 278. The opening width 213 is measured between ends of adjacent cutting teeth bodies 250. In the illustrated embodiment, a ratio between the gullet width 211 over the opening width 213 is approximately 1.6:1. In one embodiment, the ratio between the gullet width 211 over the opening width 213 is approximately 1.77:1. In another embodiment, the ratio between the gullet width 211 over the opening width 213 may be between approximately 50:1 and approximately 1.2:1. In further embodiments, the ratio between the gullet width 211 over the opening width 213 may be between approximately 10:1 and approximately 1.6:1. In yet further embodiments, the ratio between the gullet width 211 over the opening width 213 may be between approximately 2:1 and approximately 1.7:1.

Referring back to FIGS. 9 and 10, after the tooth bodies 250 and gullets 278 are formed on the saw blade body 214, cutting inserts 246 (e.g., two carbide cutting inserts 246a, 246b) are coupled to the tooth bodies 250 (step 314) to form cutting teeth 218. Each cutting tooth 218 includes a first tip 234a at a first end 236 of the cutting tooth 218 that faces away from a second tip 234b at a second end 244 of the cutting tooth 218. Each tip 234a, 234b extends into the opening width 213 of the opening 215.

Each cutting tooth 218 also includes a first rake face 238a defined by the first carbide insert 246a and the tooth body 250. The first rake face 238a has a first linear segment 217a extending from the first tip 234a toward the saw blade body 214 and a first curved segment 219a positioned between the first linear segment 217a and the saw blade body 214. The first curved segment 219a partially defines the first undercut portion 282a. Each cutting tooth 218 further includes a second rake face 238b defined by the second carbide insert 246b and the tooth body 250. The second rake face 238b has a second linear segment 217b extending from the second tip 234b toward the saw blade body 214 and a second curved segment 219b positioned between the second linear segment 217b and the saw blade body 214. The second curved segment 219b partially defines the second undercut portion 282b. In other embodiments, the first and second linear segments 217a, 217b may be curved segments. In the illustrated embodiment, a relief face 242 extends between the first and second tips 234a, 234b.

In general, the illustrated tooth bodies 250 and the gullets 278 are stamped into the saw blade body 214 and then the cutting inserts 246 are coupled to the saw blade body 214 forming the cutting teeth 218 such that a saw blade 210 is formed. The quantity of cutting teeth 218 formed on the saw blade 210 (e.g., teeth per inch) is designed to efficiently cut different work pieces. For example, a saw blade 210 having a TPI of about 7 or higher (smaller cutting teeth 218) is typically used for cutting metallic work pieces, and a saw blade 210 having a TPI of less than 7 (larger cutting teeth 218) is typically used for cutting wood work pieces. As the teeth per inch varies, a ratio of the gullet width 211 over a width of each cutting tooth 218 (e.g., a distance between the first and second tips 234a, 234b) also varies. In general, as the ratio of the gullet width 211 over the width of each cutting tooth 218 increases, the teeth per inch decreases. In one embodiment with a saw blade 210 including 6 teeth per inch, the gullet width 211 is about 0.077 inches and the width of each cutting tooth 218 is about 0.45 inches. After the saw blade 210 is formed, the saw blade 210 undergoes a process to remove burrs (e.g., roll-over) created from the stamping process and/or to form cutting edges on the cutting inserts 246.

FIGS. 11-15 illustrate a saw blade body 414 (FIG. 12) that is formed into a saw blade 410 (FIG. 14) according to another embodiment of the invention. The saw blade 410 is similar to the saw blade 210; therefore, like components have been given like reference numbers plus 200 and only the differences between the saw blades 210, 410 will be discussed in detail. In addition, components or features described with respect to only one or some of the embodiments described herein are equally applicable to any other embodiment described herein.

Figure 11:
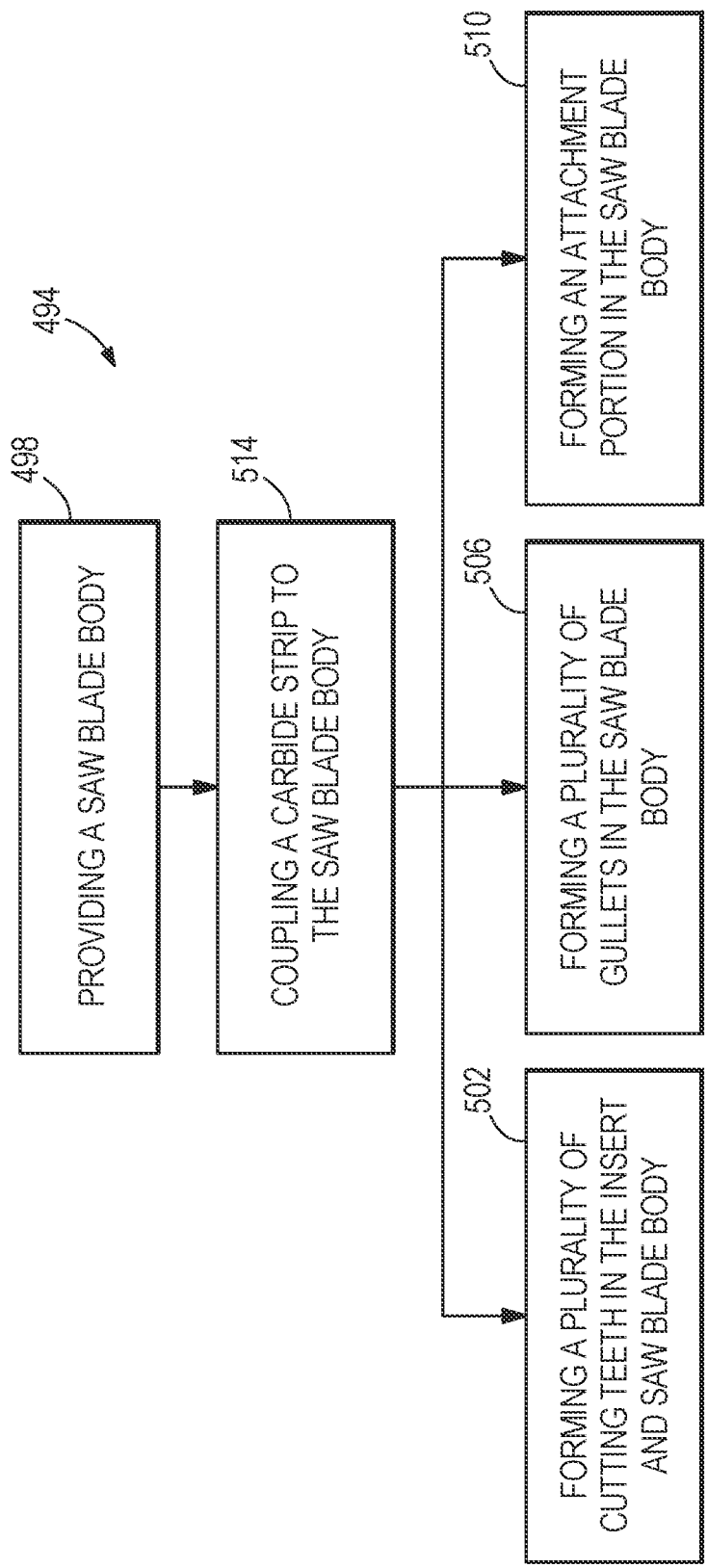
FIG. 11 illustrates a method of manufacturing a saw blade according to another embodiment of the invention.
Figure 12:
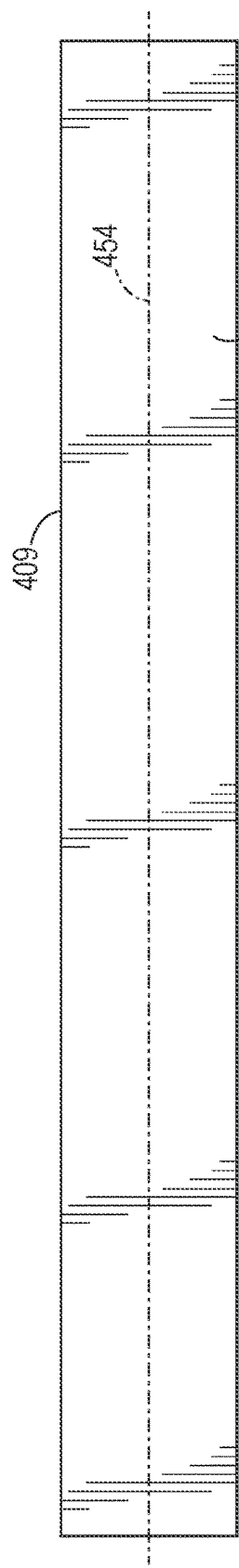
FIG. 12 illustrates a saw blade body.

A method 494 of manufacturing the saw blade 410 is illustrated in FIG. 11. At step 498, a blank saw blade body 414 (FIG. 12) having an edge 409 is provided. In the illustrated embodiment, the edge 409 is parallel to a longitudinal axis 454 of the saw blade body 414.

Figure 13:
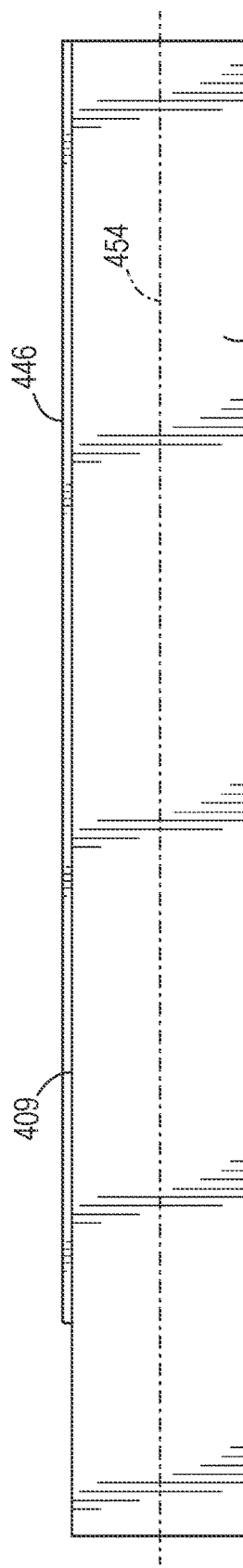
FIG. 13 illustrates a carbide strip coupled to the saw blade body.

As shown in FIG. 13, a strip 446 is coupled (e.g., by welding, brazing, etc.) to the edge 409 of the saw blade body 414 (step 514). In the illustrated embodiment, the strip 446 is carbide, and the saw blade body 414 is a ferrous metal (e.g., steel). In other embodiments, the carbide strip 446 may a ferrous metal that includes a greater hardness than the saw blade body 414.

Figure 14:
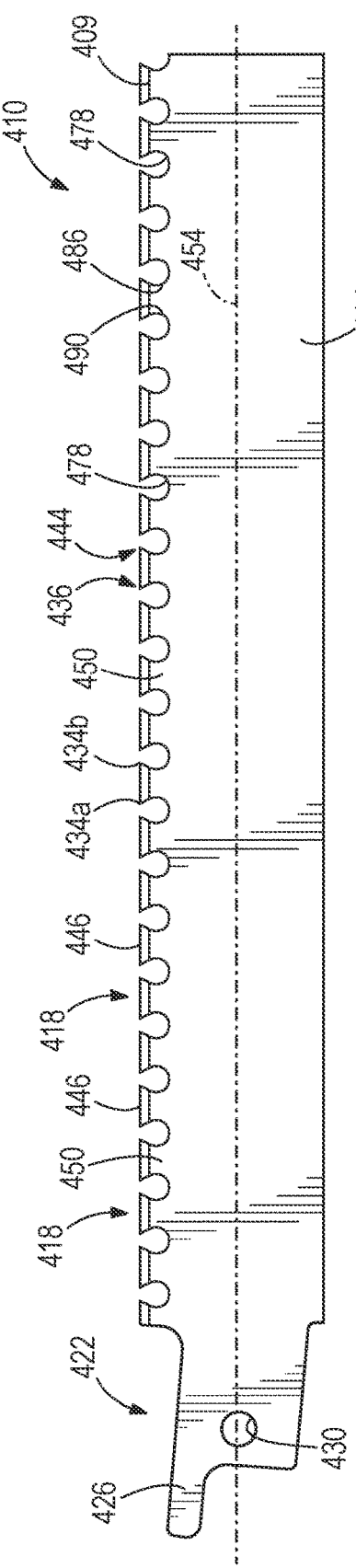
FIG. 14 illustrates cutting teeth formed in the carbide strip and the saw blade body with gullets formed between the cutting teeth.
Figure 15:
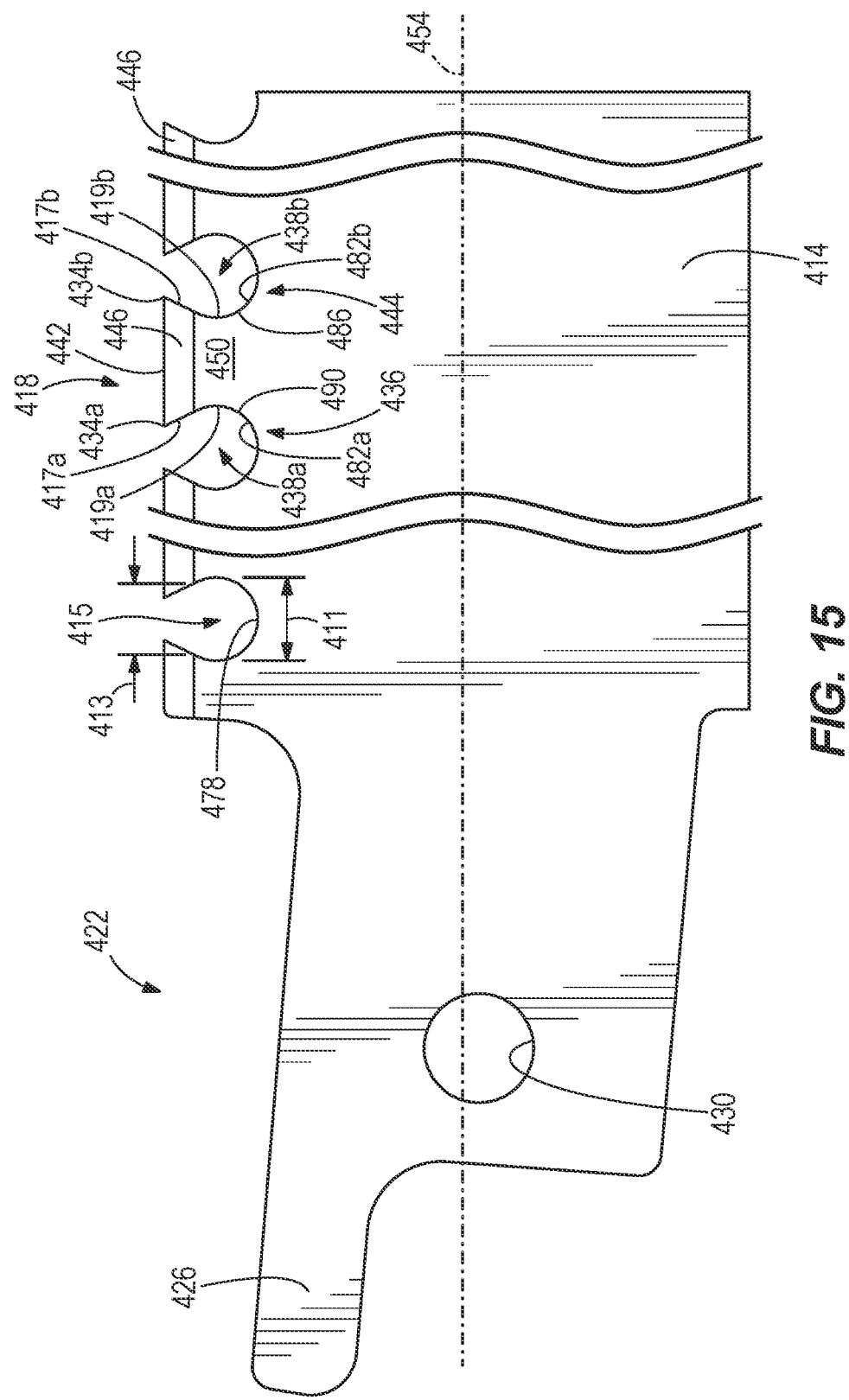
FIG. 15 is an enlarged view of portions of the saw blade of FIG. 14 illustrating the cutting teeth and the gullets.

With reference to FIG. 14, tooth bodies 450, gullets 478, and an attachment portion 422 are simultaneously formed by a stamping process in the saw blade body 414 (steps 502, 506, 510). An alternative to the stamping process includes forming the tooth bodies 450, the gullets 478, and the attachment portion 422 by wire electric diode machine (EDM). In other embodiments, the tooth bodies 450, the gullets 478, and the attachment portion 422 are formed by a laser cutting process, a grinding process, or the like. The illustrated attachment portion 422 includes a tang 426 and an aperture 430 for connecting the saw blade 410 to a reciprocating saw.

Each illustrated gullet 478 includes a first undercut portion 482a defined by a forward edge 490 of the tooth body 450 and a second undercut portion 482b defined by a rear edge 486 of the tooth body 450. The forward and rear edges 486, 490 have a constant radius so the illustrated gullets 478 are generally circular. Each gullet 478 defines a gullet width 411 that is greater than an opening width 413 of an opening 415 between adjacent tooth bodies 450.

After the tooth bodies 450 and gullets 478 are formed on the saw blade body 414, cutting teeth 418 are formed in the strip 446 and the saw blade body 414. Each strip 446 includes a first tip 434a at a first end 436 of the cutting tooth 418 that faces away from a second tip 434b at a second end 444 of the cutting tooth 418. In other embodiments, the strip 446 may be omitted such that the cutting teeth 418 are completely formed within the saw blade body 414.

Each cutting tooth 418 also includes a first rake face 438a defined by the carbide strip 446 and the tooth body 450. The first rake face 438a has a first linear segment 417a extending from the first tip 434a toward the saw blade body 414 and a first curved segment 419a positioned between the first linear segment 417a and the saw blade body 414. The first curved segments 419a partially define the first undercut portions 482a. Each cutting tooth 418 further includes a second rake face 438b defined by the carbide strip 446 and the tooth body 450. The second rake face 438b has a second linear segment 417b extending from the second tip 434b toward the saw blade body 414 and a second curved segment 419b positioned between the second linear segment 417b and the saw blade body 414. The second curved segments 419b partially define the second undercut portions 482b. In other embodiments, the first and second linear segments 417a, 417b may be curved segments. In the illustrated embodiment, a relief face 442 extends between the first and second tips 434a, 434b.

In general and contrary to the saw blade 210, the illustrated carbide strip 446 is secured to the saw blade body 414, and then the tooth bodies 450 and the gullets 478 are formed into the saw blade body 414 such that a saw blade 410 is formed including the cutting teeth 418. Both tips 434a, 434b on each cutting tooth 418 are formed by the same piece of carbide.

In other embodiments, the saw blades 10, 210, 410 may be other linear-edge type saw blades (e.g. a jig saw blade), or non-linear edge type saw blades (e.g., hole saws, band saws, etc.).

Although the invention has been described in detail with reference to certain preferred embodiments, variation and modifications exist within the scope and spirit of one or more independent aspects of the invention as described. Various features and advantages of the invention are set forth in the following claims.

The invention claimed is:

1. A saw blade comprising:
   a body;
   a plurality of cutting teeth formed on the body, each cutting tooth including a first tip at a first end of the cutting tooth, a first rake face extending from the first tip toward the body, a second tip at a second end of the cutting tooth, and a second rake face extending from the second tip toward the body, the first rake face having a first linear segment extending from the first tip, the second rake face having a second linear segment extending from the second tip; and
   a plurality of gullets formed on the body between the plurality of cutting teeth, each gullet forming a first undercut portion adjacent the first linear segment of one of the plurality of cutting teeth and a second undercut portion adjacent the second linear segment of an adjacent cutting tooth.

2. The saw blade of claim 1, wherein the first tip of each cutting tooth is formed from a first carbide insert, and wherein the second tip of each cutting tooth is formed from a second carbide insert.

3. The saw blade of claim 2, wherein a portion of each cutting tooth is defined by a tooth body, and wherein the first rake face of each cutting tooth is defined by the first carbide insert and the tooth body of each cutting tooth, and wherein the second rake face of each cutting tooth is defined by the second carbide insert and the tooth body of each cutting tooth.

4. The saw blade of claim 1, wherein the first and second tips of each cutting tooth are formed from a single carbide insert.

5. The saw blade of claim 4, wherein a portion of each cutting tooth is defined by a tooth body, and wherein the first rake face and the second rake face of each cutting tooth is defined by the single carbide insert and the tooth body of each cutting tooth.

6. The saw blade of claim 1, wherein a portion of each cutting tooth is defined by a tooth body, and wherein adjacent tooth bodies define an opening width measured between the first end and the second end of adjacent cutting teeth, and wherein each gullet defines a gullet width measured between the first undercut portion and the second undercut portion of adjacent cutting teeth that is greater than the opening width.

7. The saw blade of claim 1, wherein the first undercut portion of one of the plurality of cutting teeth and the second undercut portion of an adjacent cutting tooth have a constant radius of curvature.

8. The saw blade of claim 1, further comprising an attachment portion coupled to the body, the attachment portion including a tang and an aperture configured to couple to a reciprocating saw.

9. A method of manufacturing a saw blade, the method comprising:
providing a saw blade body having an edge;
coupling a carbide strip to the edge of the saw blade body;
forming a plurality of cutting teeth in the carbide strip and the saw blade body after the carbide strip is coupled to the edge, each cutting tooth including a first tip at a first end of the cutting tooth, a first rake face extending from the first tip toward the saw blade body, a second tip at a second end of the cutting tooth, and a second rake face extending from the second tip toward the saw blade body, the first rake face having a first linear segment extending from the first tip, the second rake face having a second linear segment extending from the second tip; and
forming a plurality of gullets in the saw blade body between the plurality of cutting teeth, each gullet forming a first undercut portion adjacent the first linear segment of one of the plurality of cutting teeth and a second undercut portion adjacent the second linear segment of an adjacent cutting tooth.

10. The method of claim 9, wherein forming the plurality of cutting teeth and forming the plurality of gullets are simultaneously performed by a stamping process.

11. The saw blade of claim 1, wherein each cutting tooth includes a first relief surface extending from the first tip toward the body and a second relief surface extending from the second tip toward the body.

12. The saw blade of claim 11, wherein an edge of the body connects the first and second relief surfaces.

13. The saw blade of claim 1, wherein each cutting tooth includes a relief surface extending between the first tip and the second tip.

14. The saw blade of claim 13, wherein the first and second tips of the plurality of cutting teeth define a plane, and wherein the relief surface of each cutting tooth is coextensive with the plane.

15. The saw blade of claim 6, wherein the gullet width is greater than a distance measured between the first tip and the second tip of adjacent cutting teeth.

16. The saw blade of claim 15, wherein the opening width is greater than the distance measured between the first tip and the second tip of adjacent cutting teeth.

17. The saw blade of claim 1, wherein a portion of each cutting tooth is defined by a tooth body, and wherein adjacent tooth bodies define an opening width measured between the first end and the second end of adjacent cutting teeth, and wherein a distance measured between the first tip and the second tip of adjacent cutting teeth is less than the opening width.

18. The method of claim 9, wherein forming the plurality of cutting teeth in the carbide strip provides a relief surface between the first tip and the second tip.

19. The method of claim 18, wherein the relief surface is coextensive with a plane defined by the first and second tips.

20. The method of claim 9, further comprising forming an attachment portion coupled to the saw blade body, wherein the attachment portion includes a tang and an aperture configured to couple to a reciprocating saw.

* * * * *